United States Patent
Sugimoto

(10) Patent No.: US 10,496,347 B2
(45) Date of Patent: Dec. 3, 2019

(54) INFORMATION PROCESSING SYSTEM AND RECORDING MEDIUM SUITABLE FOR REMOTE OPERATION OF ELECTRONIC APPARATUSES

(71) Applicant: KYOCERA Document Solutions Inc., Osaka (JP)

(72) Inventor: Kensaku Sugimoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/231,458

(22) Filed: Dec. 22, 2018

(65) Prior Publication Data
US 2019/0196768 A1    Jun. 27, 2019

(30) Foreign Application Priority Data
Dec. 22, 2017 (JP) .................................. 2017-246184

(51) Int. Cl.
*G06F 3/12* (2006.01)
*G03G 15/00* (2006.01)
*H04N 1/00* (2006.01)

(52) U.S. Cl.
CPC ....... *G06F 3/1285* (2013.01); *G03G 15/5016* (2013.01); *G03G 15/5087* (2013.01); *G06F 3/1259* (2013.01); *H04N 1/00214* (2013.01); *H04N 1/00411* (2013.01); *H04N 1/00477* (2013.01); *H04N 1/00888* (2013.01); *H04N 2201/0075* (2013.01); *H04N 2201/0094* (2013.01)

(58) Field of Classification Search
None
See application file for complete search history.

(56) References Cited

U.S. PATENT DOCUMENTS

2013/0222840 A1*  8/2013  Hosoda ............. H04N 1/00204
                                                                 358/1.14
2016/0182755 A1*  6/2016  Saito .................. H04N 1/00896
                                                                 358/1.14

FOREIGN PATENT DOCUMENTS

JP        2015-035828 A      2/2015

* cited by examiner

*Primary Examiner* — Henok Shiferaw
(74) *Attorney, Agent, or Firm* — Hawaii Patent Services; Nathaniel K. Fedde; Kenton N. Fedde

(57) ABSTRACT

Provided is an information processing system that improves user convenience. An MFP (electronic apparatus) transmits radio waves with a constant output, and a portable terminal receives the radio waves, and together with sequentially transmitting a reservation request, the reservation content, and the start of the reservation content to the MFP (electronic apparatus) in accordance with the change in the intensity of the radio wave according to the distance to the MFP (electronic apparatus), sequentially informs of the current reservation status. As a result, even when a user does not go to the place where the MFP (electronic apparatus) desired to be used is installed, by sequentially informing of the current reservation status, it is possible to inform of the number and order of people who want to use the MFP (electronic apparatus) in advance.

2 Claims, 8 Drawing Sheets

FIG.4A

RESERVATION CONFIRMATION SCREEN — 220A

| | USER ID | | |
|---|---|---|---|
| (1) | USER ID : **** — 220a | PRINTER PRINTING — 220b |
| (2) | USER ID : **** — 221a | COPY PRINTING — 221b |
| (3) | USER ID : **** — 222a | PRINTER PRINTING — 222b |
| (4) | USER ID : **** — 223a | COPY PRINTING — 223b |
| (5) | USER ID : **** — 224a | PRINTER PRINTING — 224b |
| (6) | USER ID : 1234 — 225a | PRINTER PRINTING — 225b |

START — 226   CANCEL — 227

FIG.4B

RESERVATION CONFIRMATION SCREEN — 220B

| | | |
|---|---|---|
| (1) | USER ID : **** — 220a | PRINTER PRINTING — 220b |
| (2) | USER ID : **** — 221a | COPY PRINTING — 221b |
| (3) | USER ID : **** — 222a | PRINTER PRINTING — 222b |
| (4) | USER ID : 1234 — 223a | PRINTER PRINTING — 223b |
| (5) | USER ID : **** — 224a | PRINTER PRINTING — 224b |
| (6) | USER ID : **** — 225a | COPY PRINTING — 225b |

START — 226    CANCEL — 227

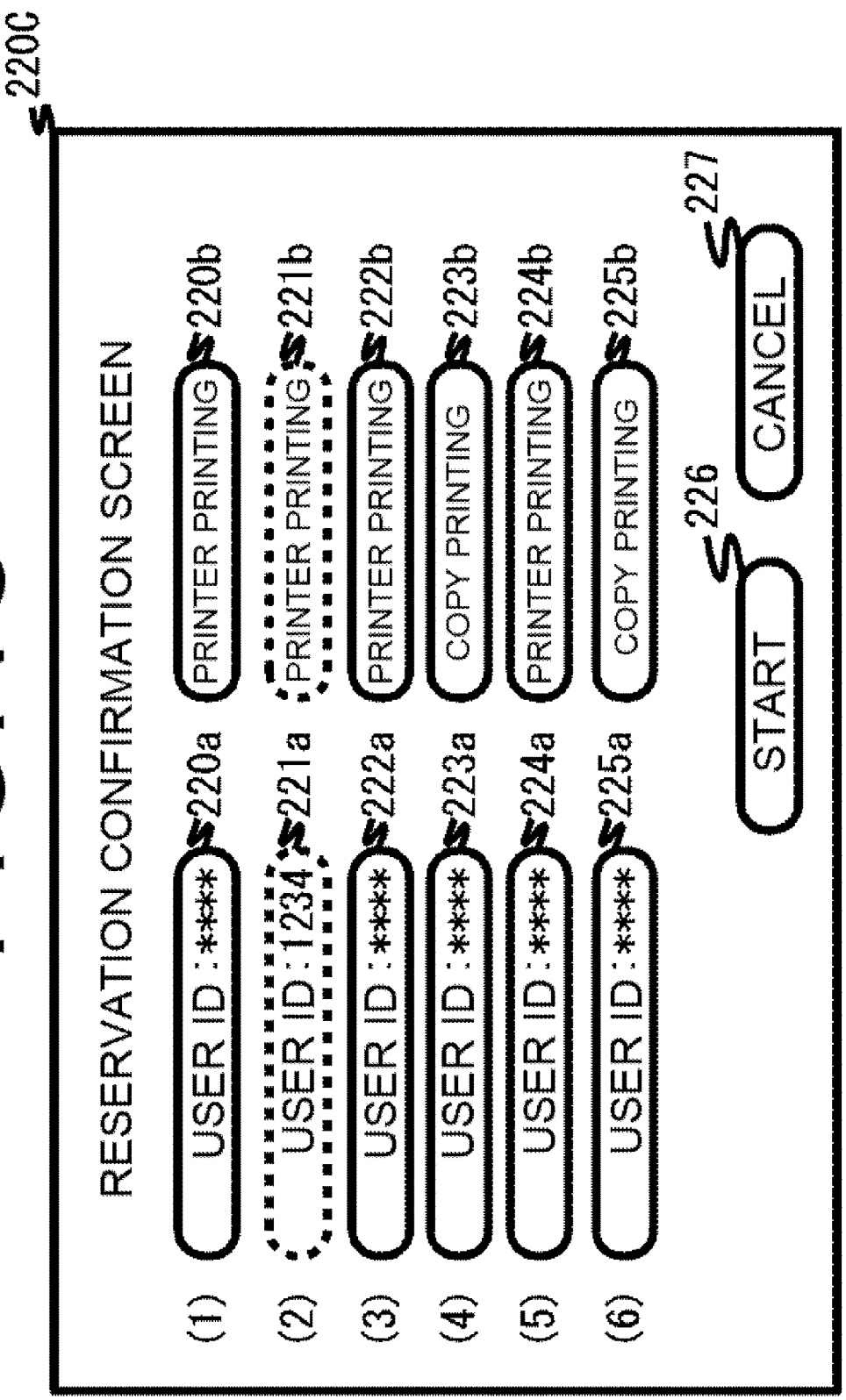

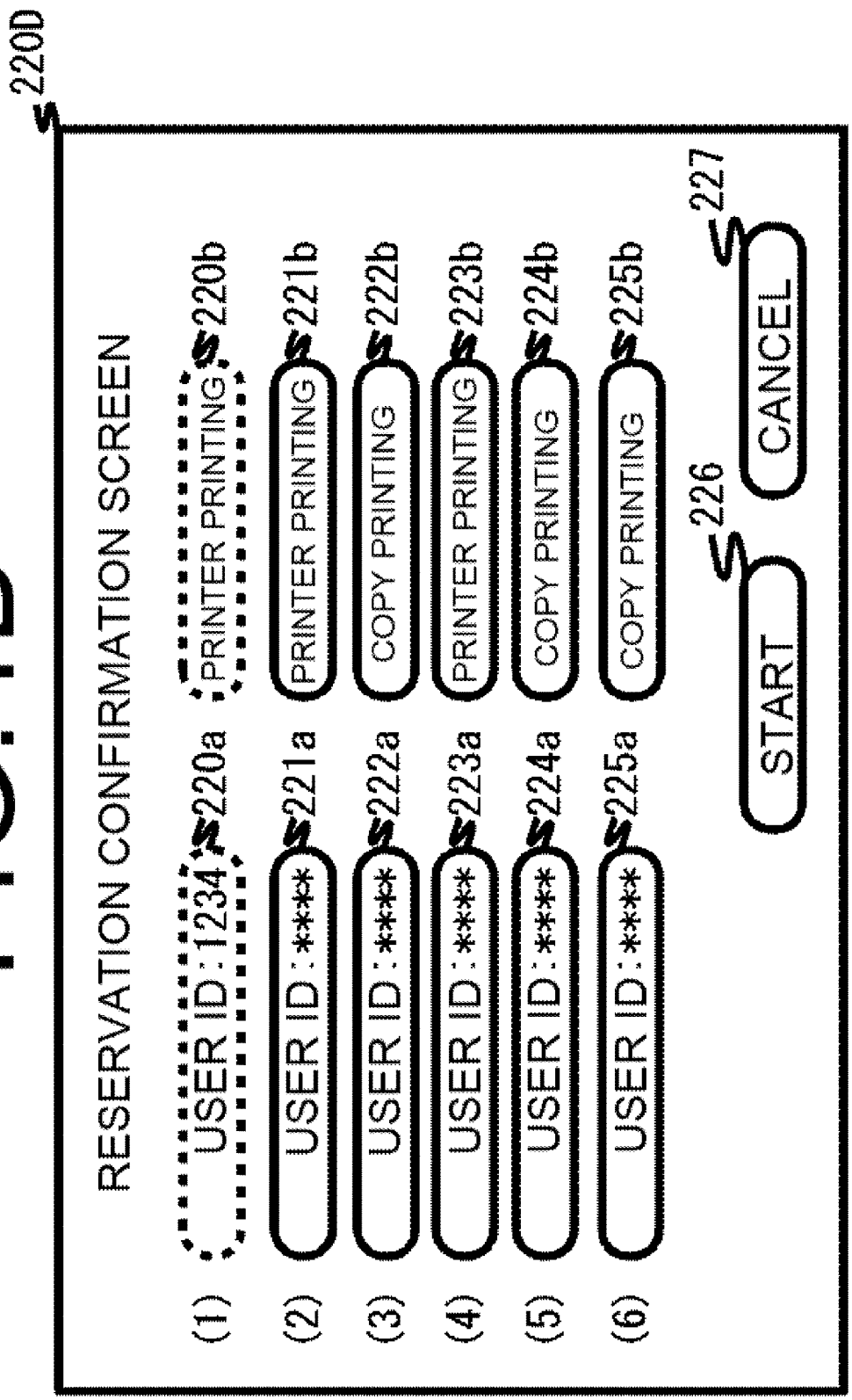

INFORMATION PROCESSING SYSTEM AND RECORDING MEDIUM SUITABLE FOR REMOTE OPERATION OF ELECTRONIC APPARATUSES

INCORPORATION BY REFERENCE

This application is based on and claims the benefit of priority from Japanese Patent Application No. 2017-246184 filed on Dec. 22, 2017, the contents of which are hereby incorporated by reference.

BACKGROUND

The present disclosure relates to an information processing system and a recording medium suitable for remote operation of electronic apparatuses.

For example, an image forming apparatus such as a multifunction printer, a MFP (multifunction peripheral), and the like is one kind of electronic apparatus. An image forming apparatus includes a printing function, a copying function, a FAX function, and a data transmitting/receiving function via a network. In addition to this, there are models equipped with a wireless communication function for performing the exchange of data with a portable terminal such as a smartphone and the like. Moreover, in such an image forming apparatus, from the aspect of prevention of leakage of confidential information, there are also models equipped with a function for performing user authentication in a login process. Incidentally, in user authentication, it is necessary to input authentication information such as a user ID (identification), a password and the like.

In addition, in such an image forming apparatus, by setting a power-saving mode, in the case where a user does not use the apparatus for a certain period of time, the operating mode switches from a normal mode to a sleep mode or to a power-OFF mode, so suppression of power consumption is also possible. Incidentally, in the case of using an image forming apparatus that has switched to the power-OFF mode, for example, a panel unit is used to give an instruction to switch to the normal mode, however, in the case of performing printing or copying, it is necessary to wait until the temperature of the fixing unit reaches a specified value.

In order to solve such an inconvenience, for example, it is conceivable to apply a detection method in a power-supply-control apparatus of typical technology. In other words, in this power-supply-control apparatus, a power-supply-state-transition-control method causes a plurality of operated units to transition to a plurality of power-supply states having different power consumption. A first moving-body-detecting method detects whether or not a moving body has entered a first detection range. A second moving-body-detecting method detects whether or not a moving body has entered a range narrower than the first detection range. Then, in the case where the first moving-body-detecting method detects a moving body, the power-supply-state-transition-control method causes an image-forming unit among an operated unit to transition to the power-supply state. In the case where the second moving-body-detecting method detects that a moving body has entered a range narrower than the first detection range, the power-supply-state-transition-control method causes a display unit among the operated unit to transition to the power-supply state.

SUMMARY

The information processing system according to the present disclosure includes an electronic apparatus and a portable terminal. The electronic apparatus transmits radio waves at a constant output. The portable terminal receives the radio waves, and together with sequentially transmitting a reservation request, reservation content, and start of the reservation content to the electronic apparatus in accordance with a change in intensity of the radio waves according to a distance to the electronic apparatus, sequentially informs of the current reservation status.

The recording medium according to the present disclosure is a non-transitory computer-readable recording medium for storing an apparatus control program executable on a computer for controlling an information processing system. The computer, when executing the apparatus control program, by an electronic apparatus, transmits radio waves at a constant output. The computer, by a portable terminal, receives the radio waves, and together with sequentially transmitting a reservation request, reservation content, and start of the reservation content to the electronic apparatus in accordance with a change in intensity of the radio waves according to a distance to the electronic apparatus, sequentially informs of the current reservation status.

BRIEF DESCRIPTION OF THE DRAWINGS

FIG. 4A is a view for describing an outline of a reservation-confirmation screen displayed on the portable terminal side in FIG. 2, and illustrates an example of the reservation-confirmation screen displayed in the case where the portable terminal approaches a distance of 20 m from the MFP, for example.

FIG. 4B is a view for describing an outline of a reservation-confirmation screen displayed on the portable terminal side in FIG. 2, and illustrates an example of the reservation-confirmation screen displayed in the case where the portable terminal approaches a distance of 12 m from the MFP, for example.

FIG. 4C is a view for describing an outline of a reservation-confirmation screen displayed on the portable terminal side in FIG. 2, and illustrates an example of the reservation-confirmation screen displayed in the case where the portable terminal approaches a distance of 1 m from the MFP, for example.

FIG. 4D is a view for describing an outline of a reservation-confirmation screen displayed on the portable terminal side in FIG. 2, and illustrates another example of the reservation-confirmation screen displayed in the case where the portable terminal approaches a distance of 1 m from the MFP, for example.

DETAILED DESCRIPTION

In the following, an embodiment of the information processing system according to the present disclosure will be described with reference to FIGS. 1 to 5. Incidentally, in the following description, as an example of the electronic apparatus is, for example, a MFP (multifunction peripheral) that is a complex peripheral apparatus equipped with a printing function, a copying function, a FAX function, a data transmitting/receiving function via a network, and the like. In addition, in the following description, for the sake of convenience of explanation, it is presumed that remote operation related to printing is performed by a remote operation application.

Figure 1:
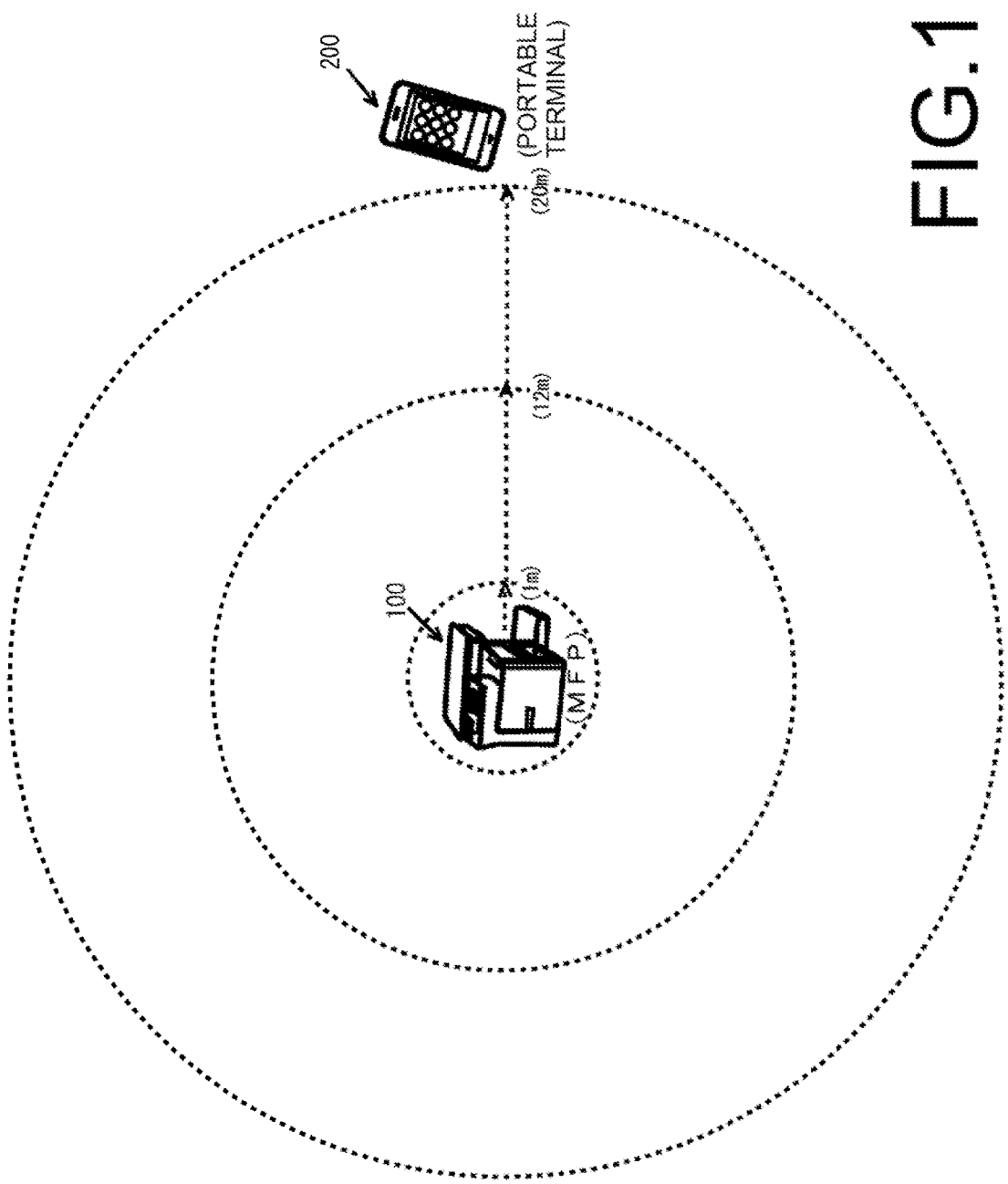
FIG. 1 is a diagram for describing an embodiment of an information processing system according to the present disclosure.

First, as illustrated in FIG. 1, the information processing system includes an MFP 100 and a portable terminal 200. The MFP 100 transmits BLE (Bluetooth (registered trademark) Low Energy: hereinafter referred to as a beacon signal) including access information such as an IP (Internet Protocol) address, URL (uniform resource locator), and the like that will be described in detail later. Note that the IP address is access information for the MFP 100, and the URL is access information of a Web page for downloading a remote operation application to be described later.

It is presumed that a wireless communication application (hereinafter referred to as a wireless communication app) enabling wireless communication with the MFP 100 is installed in the portable terminal 200. Incidentally, as wireless communication, any one of the communication methods such as Wi-Fi (registered trademark) of a wireless LAN (Local Area Network), Wi-Fi Direct (registered trademark), near-range communication Bluetooth (registered trademark), or the like can be used. In addition, it is presumed that a remote operation application (hereinafter referred to as a remote operation app) capable of remotely operating the MFP 100 is installed in the portable terminal 200. Note that in the case where the remote operation app is not installed in the portable terminal 200, the remote operation app may be downloaded from the Web page indicated by the URL included in the beacon signal.

Moreover, in the case where activation of the remote operation app is instructed, the portable terminal 200 displays a printing setting screen and the like and receives settings related to printing and the like. In other words, the printing settings on the printing setting screen can be performed at any time without being restricted by time or place. In addition, although details will be described later, the portable terminal 200 first transmits a reservation request to the MFP 100 according to the distance to the MFP 100, and then transmits the content of the printing settings set on the printing setting screen and the printing data to the MFP 100. Incidentally, the printing data may be stored in a RAM 212 or a USB memory. Furthermore, the printing data may be registered in a user box of a HDD 106 on the side of the MFP 100, which will be described later in FIG. 2.

In other words, when the distance from the MFP 100 reaches, for example, about 20 m, the portable terminal 200 transmits a reservation request to the MFP 100 by communication according to the procedure of the wireless communication app. At this time, the portable terminal 200 transmits authentication information such as a user ID (identification), a password and the like to the MFP 100. On the MFP 100 side, when the user authentication based on the authentication information is successful, the reservation is received. In addition, on the MFP 100 side, upon receiving the reservation, reservation information indicating the reservation status is transmitted to the portable terminal 200. Here, the reservation information includes the reservation order of each reservation received by the MFP 100, the user ID, and the reservation content. The portable terminal 200 activates the remote operation app, and after receiving the reservation information indicating the reservation status from the MFP 100, displays a reservation confirmation screen 220A as illustrated in FIG. 4A described later. Note that even when the distance from the MFP 100 is, for example, about 20 m, in an environment where the MFP 100 can be confirmed, the printing setting content and the printing data may be transmitted in accordance with the reservation request.

Moreover, when the distance from the MFP 100 reaches, for example, about 12 m, the portable terminal 200 transmits the printing setting content and printing data maintained by the remote operation app to the MFP 100.

Furthermore, when the distance from the MFP 100 reaches, for example, about 12 m, the portable terminal 200 requests the MFP 100 to transmit the reservation information indicating the reservation status. At this time, the MFP 100 transmits the reservation information indicating the current reservation status to the portable terminal 200. Upon receiving the reservation information from the MFP 100 indicating the current reservation status, the portable terminal 200 displays a reservation confirmation screen 220B as illustrated in FIG. 4B described later.

Moreover, when the distance from the MFP 100 reaches, for example, about 1 m, the portable terminal 200 requests the MFP 100 to transmit the reservation information indicating the reservation status. At this time, the MFP 100 transmits the reservation information indicating the current reservation status to the portable terminal 200. Upon receiving the reservation information from the MFP 100 indicating the current reservation status, the portable terminal 200 displays a reservation confirmation screen 220C as illustrated in FIG. 4C described later or a reservation confirmation screen 220D as illustrated in FIG. 4D described later. Note that the distance from the MFP 100 is not limited to 20 m, 12 m, and 1 m as described above, but can be arbitrarily set according to the installation environment of the MFP 100.

Figure 2:
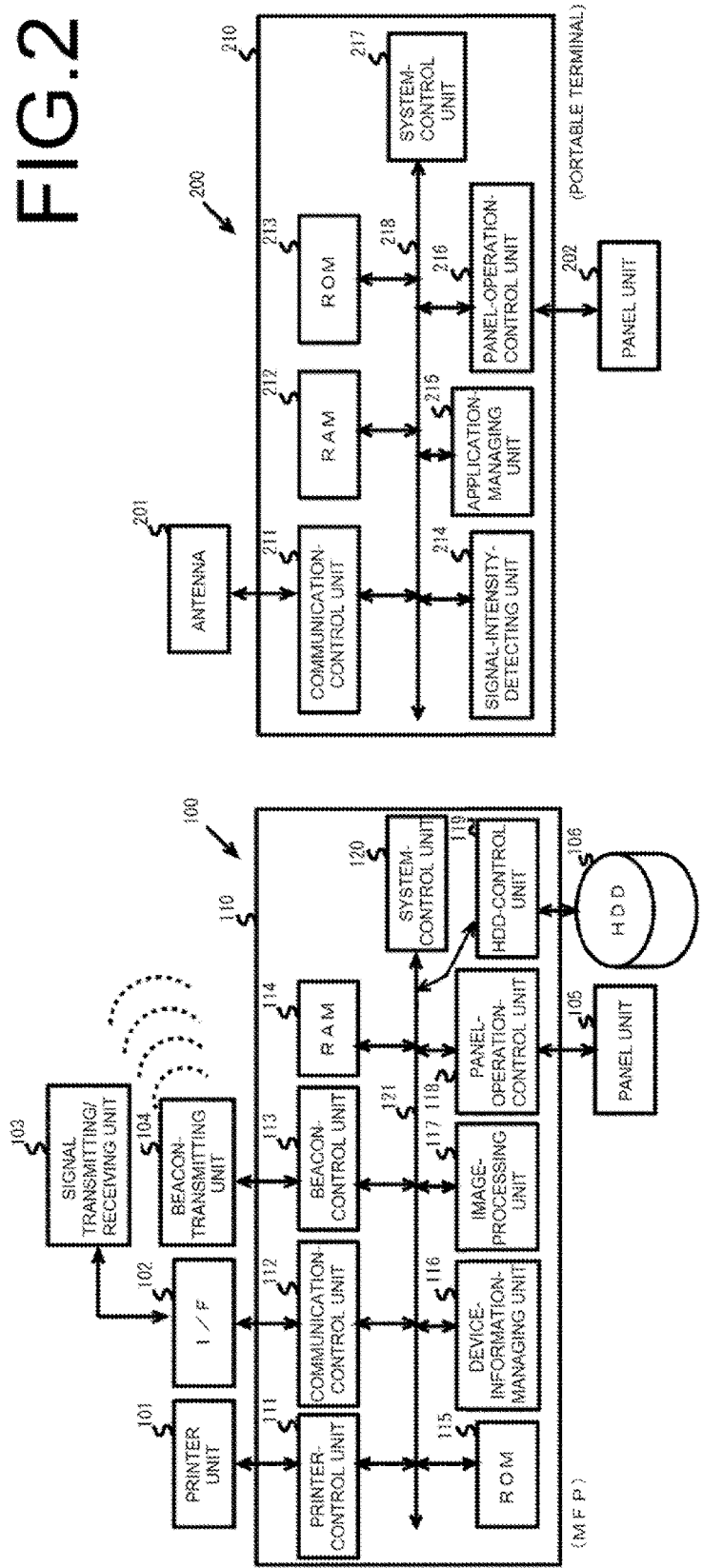
FIG. 2 is a diagram for describing an example of the configuration of the MFP and the portable terminal in FIG. 1.

Next, an example of the configuration of the MFP 100 and portable terminal 200 will be described with reference to FIG. 2. First, the MFP 100 includes a control unit 110 that controls a printer unit 101, an I/F (interface) 102, a signal transmitting/receiving unit 103, a beacon-transmitting unit 104, a panel unit 105, and a HDD 106. Incidentally, the MFP 100 may include a scanner unit, a FAX unit, and the like.

The printer unit 101 is a device that prints an image on paper based on printing data outputted from the control unit 110. The I/F 102 is in charge of communication with the portable terminal 200 via the signal transmitting/receiving unit 103. Incidentally, the communication method of the I/F 102 may be Wi-Fi (registered trademark) of a wireless LAN, Wi-Fi Direct (registered trademark), near-range communication Bluetooth (registered trademark), or the like. In addition, the I/F 102 may be in charge of communication with a content server, a web server, or the like via a network.

The beacon-transmitting unit 104 transmits beacon signals at a regular interval (for example, at intervals of one second) at a constant output. The panel unit 105 is a device such as a touch panel or the like that performs a printing function, a copying function, a FAX function, a data transmitting/receiving function via a network, and a display for various settings of the MFP 100. The HDD 106 is a storage device that stores application programs and the like for providing various functions of the MFP 100. In addition, the HDD 106 also has a user box for storing printing jobs registered from the portable terminal 200 or a user terminal, for example.

The control unit 110 is a processor that controls the overall operation of the MFP 100 by executing an image forming program, a control program, and the like. The control unit 110 includes a printer-control unit 111, a communication-control unit 112, a beacon-control unit 113, a RAM (random access memory) 114, a ROM (read only memory) 115, an device-information-managing unit 116, an image-processing unit 117, a panel-operation-control unit 118, an HDD-control unit 119, and a system-control unit 120. In addition, these units are connected to a data bus 121. The printer-control unit 111 controls the printing operation of the printer unit 101. The communication-control unit 112 controls transmission and reception of data and the like to and from the portable terminal 200 via the I/F 102 and the signal transmitting/receiving unit 103. In addition, the communication-control unit 112, via the I/F 102, controls transmission and reception of data and the like via a network.

The beacon-control unit 113 controls the transmission operation of the beacon signals of the beacon-transmitting unit 104. In this case, the beacon-control unit 113 controls the beacon-transmitting unit 104 so as to transmit beacon signals at regular intervals (for example, at intervals of one second) and at a constant output. The RAM 114 is a work memory for executing programs. The ROM 115 stores a control program for performing operation checks and the like of each unit. The device-information-managing unit 116 manages, as device information, basic function and additional function information installed in the MFP 100, firmware version information of each function, and the like. The image-processing unit 117 performs image processing (rasterization) on a printing job registered in a user box of the HDD 106, for example. Incidentally, the system-control unit 120 temporarily stores the printing data image-processed by the image-processing unit 117 in the RAM 114.

The panel-operation-control unit 118 controls the display operation of the panel unit 105. In addition, the panel-operation-control unit 118, via the panel unit 105, receives settings and the like such as the start of printing, copying, FAX, data transmission/reception via a network, and the like. The HDD-control unit 119 controls reading and writing of data to and from the HDD 106, and the like. The system-control unit 120 controls the cooperative operation of each unit. Moreover, upon receiving, for example, a printing instruction from the panel unit 105 or the portable terminal 200, the system-control unit 120 issues an image-processing instruction to the image-processing unit 117, an instruction to print by the printer unit 101 to the printer-control unit 111, and the like. Furthermore, as will be described in detail later, the system-control unit 120 cause any one of a printing function, a copying function, a FAX function, a scanner function, a data transmitting/receiving function via a network to be executed in accordance with a remote instruction based on a remote operation app from the portable terminal 200.

The portable terminal 200 includes an antenna 201 and a control unit 210 for controlling a panel unit 202. The antenna 201 transmits and receives radio waves to and from a radio base station. In addition, the antenna 201 receives beacon signals transmitted from the MFP 100. Moreover, the antenna 201 transmits and receives radio waves used for wireless communication with the MFP 100. In other words, in the case where the communication method is Wi-Fi (registered trademark), the antenna 201 transmits and receives radio waves to and from the MFP 100 via a wireless LAN router. Furthermore, in the case where the communication method is P2P (Peer to Peer) (for example, Wi-Fi Direct (registered trademark), Bluetooth (registered trademark)), the antenna 201 transmits and receives radio waves to and from the signal transmitting/receiving unit 103 of the MFP 100.

The control unit 210 is a processor that controls the overall operation of the portable terminal 200 by executing a control program and the like. The control unit 210 includes a communication-control unit 211, a RAM 212, a ROM 213, a signal-intensity-detecting unit 214, an application-managing unit 215, a panel-operation-control unit 216, and a system-control unit 217. In addition, these units are connected to a data bus 218.

The communication-control unit 211, via the antenna 201, controls transmission and reception of data and the like to and from the MFP 100. In addition, the communication-control unit 211, via the antenna 201, controls transmission and reception of data and the like via a network. The RAM 212 is a work memory for executing programs. The ROM 213 stores a control program for performing operation checks and the like of each unit. The signal-intensity-detecting unit 214 detects the intensity (dBm) of the beacon signals transmitted from the MFP 100. The application-managing unit 215 manages various applications including a remote operation app and the like installed in the portable terminal 200. The panel-operation-control unit 216 controls the display operation of the panel unit 202.

The system control unit 217 controls the cooperative operation of each unit. In addition, as will be described later in detail, the system-control unit 217 sequentially executes the transmission of reservation requests, printing setting content, printing data, and the like to the MFP 100, a display of the reservation confirmation screens 220A to 220D illustrated in FIGS. 4A to 4D and the like. This is based on the intensity (dBm) of the beacon signals detected by the signal-intensity-detecting unit 214.

Figure 3:
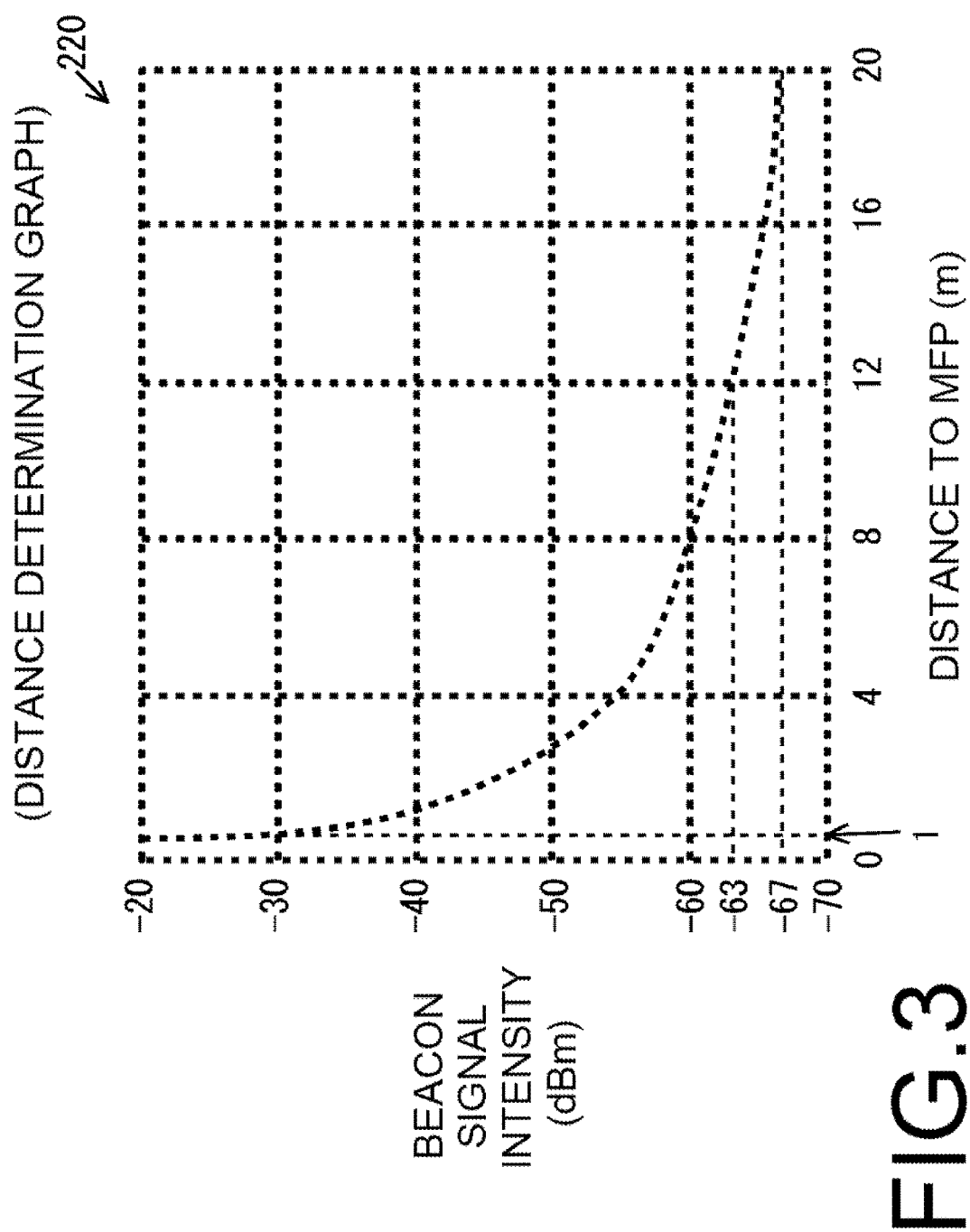
FIG. 3 is a diagram illustrating an example of a distance determination graph to be referred to when the system-control unit on the portable terminal side in FIG. 2 determines the distance to the MFP.

Next, an example of a distance determination graph referred to when the system-control unit 217 of the portable terminal 200 determines the distance to the MFP 100 will be described with reference to FIG. 3. In other words, the intensity (dBm) of the beacon signals transmitted by the MFP 100 is attenuated in inverse proportion to the square of the distance. Here, when the signal-intensity-detecting unit 214 detects the intensity (dBm) of a beacon signal as, for example, −67 dBm (0.00000001 mW), the system-control unit 217, from the distance determination graph 220, determines that the distance to the MFP 100 is, for example, 20 m. Moreover, when the signal-intensity-detecting unit 214 detects the intensity (dBm) of a beacon signal as, for example, −63 dBm (0.00000005 mW), the system-control unit 217, from the distance determination graph 220, determines that the distance to the MFP 100 is, for example, 12 m. Furthermore, when the signal-intensity-detecting unit 214 detects the intensity (dBm) of a beacon signal as, for example, −30 dBm (0.001 mW), the system-control unit 217, from the distance determination graph 220, determines that the distance to the MFP 100 is, for example, 1 m.

Next, an outline of the reservation confirmation screen according to the procedure of the remote operation app on the portable terminal 200 side will be described with reference to FIGS. 4A to 4D. First, FIG. 4A illustrates an example of a reservation confirmation screen 220A when the portable terminal 200 approaches a distance of 20 m to the MFP 100, for example, and requests the MFP 100 for a reservation. On the reservation confirmation screen 220A, reservation order display fields 220a to 225a indicating the order of reservations, reservation content display fields 220b to 225b indicating reservation content for each reserved user, a start button 226, and a cancel button 227 are displayed.

In the reservation order display fields 220a to 225a, for example, the user ID is displayed in accordance with the order of reservation indicated by (1) to (6), for example. In addition, the user ID of the reserved user is displayed enclosed by a broken line so as to be distinguishable from other users. Incidentally, for the user ID of the reserved user, lighting, blinking, display color, or the like may be changed so as to be distinguishable from other users. Moreover, for the user ID displayed in the reservation order display fields 220a to 225a, information on the reserved user is displayed, but information on other users is not displayed. In this case, for example, information on other users is represented by "****" so that the reserved user cannot identify the information of other users. By doing like this, it is possible to prevent unauthorized use or the like of user IDs of other users. Note that in the reservation order display fields 220a to 225a, the display is not limited to only the user ID, but also the reservation number may be displayed.

In the reservation content display fields 220b to 225b, reservation content of the reserved user such as "printer printing", "copy printing", and the like are displayed. Here, as illustrated in the drawing, the reservation content is not limited to "printer printing" and "copy printing" but may be FAX transmission, FAX reception, data transmission, data reception, or the like. Moreover, in the case where it is possible to specify from the amount of printing data the time until the completion of printing as in the case of printer printing, the usage time may be displayed as a guide. The start button 226 is used for performing a touch operation when instructing the MFP 100 to perform remote operation such as printing or the like. However, the touch operation of the start button 226 is invalidated until the order of reservation becomes the highest, and when the order of reservation becomes the highest, the touch operation is enabled. In other words, in the case where the user ID of the reserved user displayed in the reservation order display fields 220a to 225a is (6) (sixth) as illustrated in FIG. 4A, the touch operation of the start button 226 is invalidated. Therefore, even in the case where the start button 226 is touch-operated by mistake, an instruction to start the MFP 100 is not issued. On the other hand, as illustrated in FIG. 4D that will be described later, when the user ID of the reserved user is (1) (first), which is the top of the user IDs, the touch operation of the start button 226 is enabled. Therefore, when the start button 226 is touch-operated, a start instruction can be issued to the MFP 100. The cancel button 227 is touch-operated when canceling a reservation.

Next, FIG. 4B illustrates an example of the reservation confirmation screen 220B displayed when the portable terminal 200 approaches a distance of 12 m to the MFP 100, for example. In other words, when the distance from the MFP 100 reaches, for example, about 12 m, the portable terminal 200 transmits the printing setting content and printing data maintained by the remote operation app to the MFP 100. At this time, the portable terminal 200 requests the MFP 100 to transmit the reservation information indicating the reservation status. Then, upon receiving the reservation information indicating the current reservation status from the MFP 100, the portable terminal 200 displays the reservation confirmation screen 220B illustrated in FIG. 4B.

Here, in FIG. 4B, it is illustrated that the order of the reserved user is moved up from (6) (sixth) to (4) (fourth). In other words, it indicates that the order of the reserved user has been moved up with the elapse of time due to approaching, for example, a distance of 12 m to the MFP 100 from the initial reservation performed by the portable terminal 200 at a position separated 20 m from the MFP 100.

Next, FIG. 4C illustrates an example of the reservation confirmation screen 220C displayed when the portable terminal 200 approaches a distance of 1 m to the MFP 100, for example. In other words, when reaching a distance of about 1 m from the MFP 100, for example, the portable terminal 200 requests the MFP 100 to transmit the reservation information indicating the reservation status. At this time, upon receiving the reservation information from the MFP 100 indicating the current reservation status, the portable terminal 200 displays the reservation confirmation screen 220C illustrated in FIG. 4C, for example. Here, on the reservation confirmation screen 220C in FIG. 4C, it is illustrated that the order of the reserved user is moved up from (4) (fourth) to (2) (second). In other words, it indicates that the order of the reserved user has been moved up with the elapse of time due to approaching, for example, to a distance of 1 m to the MFP 100 after confirming the reservation status at the position where the portable terminal 200 is separated 12 m from the MFP 100.

Incidentally, as illustrated on the reservation confirmation screen 220 C in FIG. 4C, in the case where the order of the reserved user is (2) (second), in other words, the order of the reserved user is not the highest, the touch operation of the start button 226 is invalidated. Therefore, the reserved user must wait until the touch operation of the start button 226 is enabled. In other words, since the touch operation of the start button 226 is invalidated, the portable terminal 200 is unable use the MFP 100. In this case, even though reaching a distance of about 1 m from the MFP 100, for example, the order of the reserved user is (2) (second) as on the reservation confirmation screen 220D in FIG. 4C. Therefore, when a certain time (for example, one minute) has elapsed since the first request for transmission of reservation information when reaching a distance of about 1 m from the MFP 100, for example, the portable terminal 200 re-requests the MFP 100 to transmit reservation information indicating the reservation status. In this case, when it can be confirmed that there is a user who reserved before in the vicinity of the MFP 100 and is waiting for completion of the processing by the MFP 100, it is possible to confirm the progress of processing by the MFP 100 by the user who reserved before. On the other hand, in the case where the user who reserved before is not in the vicinity of the MFP 100, it is not possible to confirm the progress of processing by the MFP 100 by the user who reserved before.

Here, as a case where the user who reserved before is not in the vicinity of the MFP 100, it is presumed that the user left the MFP 100 as is after giving an instruction for data transmission, for example. Moreover, it is estimated that the user who reserved before has given up on using the MFP 100 and has left the MFP 100 as is. In this case, when there is no instruction to start by the reserved user even when a certain period of time (for example, one minute) has elapsed since the reserved time, the MFP 100 may cancel the previous reservation and move up to the next reservation. Incidentally, when the processing by the previous user has not been completed during the reserved time, and there is no instruction to start by the reserved user even when a certain time (for example, one minute) has elapsed since the processing by the previous user was completed, the MFP 100 may cancel the previous reservation and move up to the next reservation.

Next, FIG. 4D illustrates an example of the reservation confirmation screen 220D that is displayed when the portable terminal 200 re-requests the MFP 100 to transmit reservation information indicating the reservation status.

Here, as illustrated on the reservation confirmation screen 220D in FIG. 4D, when the order of the reserved user is moved up to the top of the order, which is (1) (first), the start button 226 is activated. Therefore, when touch operation is performed on the start button 226, printer printing by the MFP 100 is started based on an instruction from the portable terminal 200.

Incidentally, the MFP 100 may transmit the reservation information indicating the reservation status at intervals of a fixed time (for example, one minute) without receiving a request for transmission of the reservation information from the portable terminal 200. In this case, the request for transmitting the reservation information from the portable terminal 200 can be omitted.

Next, the reservation process in the information processing system will be described with reference to FIG. 5. Note that in the following description, the level in the case where the intensity (dBm) of the beacon signals detected by the signal-intensity-detecting unit 214 is, for example, no less than −67 dBm (0.00000001 mW) but less than −63 dBm (0.00000005 mW) is set as a first level. The level in the case where the intensity (dBm) of the beacon signals detected by the signal-intensity-detecting unit 214 is, for example, no less than −63 dBm (0.00000005 mW) but less than −30 dBm (0.001 mW) is set as a second level. The level in the case where the intensity (dBm) of the beacon signals detected by the signal-intensity-detecting unit 214 is, for example, −30 dBm (0.001 mW) or more is set as a third level. In addition, in the following description, the portable terminal 200 sequentially executes the transmission of reservation requests, printing setting content, printing data, and the like, while moving toward the MFP 100 side, for example. In the following description, it is presumed that the display of the reservation confirmation screens 220A to 220D illustrated in FIGS. 4A to 4D is sequentially executed based on the reservation information from the MFP 100 indicating the current reservation status. Moreover, in the following description, it is presumed that printer printing is reserved by the MFP 100. Furthermore, in the following description, it is presumed that the remote operation app maintains printing setting content set in advance.

(Step S101)

The system-control unit 217 determines whether or not a beacon signal has been received.

In this case, when there is no notification informing that a beacon signal has been received from the communication-control unit 211, the system-control unit 217 determines that a beacon signal has not been received (step S101: NO).

On the other hand, when there is a notification informing that a beacon signal has been received from the communication-control unit 211, the system-control unit 217 determines that a beacon signal has been received (step S101: YES), and the process moves to step S102.

(Step S102)

The system-control unit 217 causes the intensity of the beacon signal (dBm) to be detected.

In this case, the system-control unit 217 causes the signal-intensity-detecting unit 214 to detect the intensity (dBm) of the beacon signals.

At this time, the signal-intensity-detecting unit 214 detects the intensity (dBm) of the beacon signals transmitted from the MFP 100 at regular intervals (for example, at intervals of one second) at regular intervals (for example, at intervals of one second), and notifies the system-control unit 217.

(Step S103)

The system-control unit 217 determines whether or not the detection result has been received.

In this case, when the intensity (dBm) of the beacon signals detected by the signal-intensity-detecting unit 214 has not been received, the system-control unit 217 determines that the detection result has not been received (step S103: NO).

On the other hand, when the intensity (dBm) of the beacon signals detected by the signal-intensity-detecting unit 214 has been received, the system-control unit 217 determines that the detection result has been received (step S103: YES), and the process moves to step S104.

At this time, the system-control unit 217 acquires access information such as the IP address, the URL and the like included in the beacon signal.

In addition, the system-control unit 217 activates the wireless communication app.

Moreover, when the remote operation app is not activated, the system-control unit 217 activates the remote operation app.

(Step S104)

The system-control unit 217 determines whether or not the intensity (dBm) of the beacon signals detected by the signal-intensity-detecting unit 214 is at the first level.

In this case, the system-control unit 217 checks the intensity (dBm) of the beacon signals detected by the signal-intensity-detecting unit 214. For example, in the case where the intensity is less than −67 dBm (0.00000001 mW) or equal to or greater than −63 dBm (0.001 mW), it is determined that the intensity is not the first level (step S104: NO).

On the other hand, the system-control unit 217 checks the intensity (dBm) of the beacon signals detected by the signal-intensity-detecting unit 214. For example, when the intensity is equal to or greater than −67 dBm (0.00000001 mW) and less than −63 dBm (0.00000005 mW), it is determined that the intensity is the first level (step S104: YES), and the process moves to step S105.

(Step S105)

The system-control unit 217 requests the MFP 100 for a reservation.

In this case, the system-control unit 217 requests the communication-control unit 211 to make a reservation based on the IP address acquired from the beacon signal according to the procedure of the activated wireless communication app.

At this time, the communication-control unit 211 transmits authentication information such as a user ID (identification), a password and the like to the MFP 100 by wireless communication via the antenna 201 in accordance with the reservation request.

On the MFP 100 side, when the communication-control unit 112 receives a reservation request via the signal transmitting/receiving unit 103, user authentication is performed based on the authentication information from the portable terminal 200, and when the user authentication is successful, the reservation is received. In addition, on the MFP 100 side, upon receiving the reservation, reservation information indicating the reservation status is transmitted to the portable terminal 200.

(Step S106)

The system-control unit 217 determines whether reservation information indicating the current reservation status has been received from the MFP 100.

In this case, when there is no notification from the communication-control unit 211 indicating that reservation information has been received, the system-control unit 217 determines that reservation information from the MFP 100 has not been received (step S106: NO).

On the other hand, when there is a notification from the communication-control unit 211 indicating that reservation information has been received, the system-control unit 217 determines that reservation information from the MFP 100 has been received (step S106: YES), and the process moves to step S107.

(Step S107)

The system-control unit 217 causes the reservation confirmation screen 220A to be displayed.

In this case, the system-control unit 217, via the panel-operation-control unit 216, causes the reservation confirmation screen 220A illustrated in FIG. 4A to be displayed on the panel unit 202 according to the procedure of the remote operation app.

Here, the user can confirm from the reservation order display fields 220a to 225a on the reservation confirmation screen 220A that the reservation order is (6) (sixth) (lowest).

(Step S108)

The system-control unit 217 determines whether or not the intensity (dBm) of the beacon signals detected by the signal-intensity-detecting unit 214 is the second level.

In this case, the system-control unit 217 checks the intensity (dBm) of the beacon signals detected by the signal-intensity-detecting unit 214. For example, when the intensity is less than −63 dBm (0.00000005 mW) or is equal to or greater than −30 dBm (0.001 mW), it is determined that the intensity is not the second level (step S108: NO).

On the other hand, the system-control unit 217 checks the intensity (dBm) of the beacon signals detected by the signal-intensity-detecting unit 214. For example, when the intensity is equal to or greater than −63 dBm (0.00000005 mW) but less than −30 dBm (0.001 mW), it is determined that the intensity is the second level (step S108: YES), and the process moves to step S109.

(Step S109)

The system-control unit 217 causes the printing setting content and printing data to be transmitted.

In this case, the system-control unit 217 instructs the communication-control unit 211 to transmit the printing setting content maintained by the remote operation app and the printing data stored in the RAM 212 or a USB memory.

At this time, the communication-control unit 211 transmits the printing setting content maintained by the remote operation app and the printing data stored in the RAM 212 or a USB memory to the MFP 100 via the antenna 201.

(Step S110)

The system-control unit 217 requests the MFP 100 for reservation information indicating the current reservation status.

In this case, the system-control unit 217, via the communication-control unit 211 and in accordance with the procedure of the wireless communication app, requests the reservation information indicating the current reservation status based on the IP address acquired from the beacon signal.

On the MFP 100 side, the communication-control unit 112, after receiving a request for reservation information via the signal transmitting/receiving unit 103, transmits reservation information indicating the current reservation status to the portable terminal 200.

(Step S111)

The system-control unit 217 determines whether or not reservation information indicating the current reservation status has been received from the MFP 100.

In this case, when there is no notification indicating that the reservation information has been received from the communication-control unit 211, the system-control unit 217 determines that reservation information from the MFP 100 has not been received (step S111: NO).

On the other hand, when there is a notification indicating that the reservation information has been received from the communication-control unit 211, the system-control unit 217 determines that reservation information from the MFP 100 has been received (step S111: YES), and the process moves to step S112.

(Step S112)

The system-control unit 217 causes the reservation confirmation screen 220B to be displayed.

In this case, the system-control unit 217 causes the reservation confirmation screen 220B illustrated in FIG. 4B to be displayed on the panel unit 202 via the panel operation control unit 216 according to the procedure of the remote operation app.

Here, the user can confirm from the reservation order display fields 220a to 225a on the reservation confirmation screen 220B that the reservation order has been moved up to (4) (fourth).

(Step S113)

The system-control unit 217 determines whether or not the intensity (dBm) of the beacon signals detected by the signal-intensity-detecting unit 214 is the third level.

In this case, the system-control unit 217 checks the intensity (dBm) of the beacon signals detected by the signal-intensity-detecting unit 214, and when, for example, the intensity is less than −30 dBm (0.001 mW), the system-control unit 217 determines that the intensity is not the third level (step S113: NO).

On the other hand, the system-control unit 217 checks the intensity (dBm) of the beacon signals detected by the signal-intensity-detecting unit 214, and when, for example, the intensity is equal to or greater than −30 dBm (0.001 mW), the system-control unit 217 determines that the intensity is the third level (step S113: YES), and the process moves to step S114.

(Step S114)

The system-control unit 217 requests the MFP 100 for reservation information indicating the current reservation status.

In this case, the system-control unit 217, via the communication-control unit 211 and in accordance with the procedure of the wireless communication app, requests the reservation information indicating the current reservation status based on the IP address acquired from the beacon signal.

On the MFP 100 side, the communication-control unit 112, after receiving a request for reservation information via the signal transmitting/receiving unit 103, transmits reservation information indicating the current reservation status to the portable terminal 200.

(Step S115)

The system-control unit 217 determines whether or not reservation information indicating the current reservation status has been received from the MFP 100.

In this case, when there is no notification from the communication-control unit 211 indicating that the reservation information has been received, the system-control unit 217 determines that reservation information from the MFP 100 has not been received (step S115: NO).

On the other hand, when there is a notification from the communication-control unit 211 indicating that the reservation information has been received, the system-control unit 217 determines that the reservation information from the MFP 100 has been received (step S115: YES), and the process moves to step S116.

(Step S116)

The system-control unit 217 causes the reservation confirmation screen 220C or the reservation confirmation screen 220D to be displayed.

In this case, in accordance with the procedure of the remote operation app, the system-control unit 217, via the panel-operation-control unit 216, causes the reservation confirmation screen 220C illustrated in FIG. 4C or the reservation confirmation screen 220D illustrated in FIG. 4D to be displayed on the panel unit 202.

In other words, it is presumed that at the time of requesting the reservation information in step S114, the system-control unit 217, via the panel-operation-control unit 216, causes the reservation confirmation screen 220C illustrated in FIG. 4C to be displayed on the panel unit 202 based on the reservation information received from the MFP 100. In this case, it can be confirmed from the reservation confirmation screen 220C that the order of reservation has moved up to (2) (second).

Moreover, it is presumed that at the time of requesting the reservation information in step S114, the system-control unit 217, via the panel-operation-control unit 216, causes the reservation confirmation screen 220D illustrated in FIG. 4D to be displayed on the panel unit 202 based on the reservation information received from the MFP 100. In this case, it can be confirmed from the reservation confirmation screen 220D that the order of reservation has moved up to (1) (first).

Incidentally, in the case where the order of the reserved user is (2) (second) as in the reservation confirmation screen 220C in FIG. 4C, the system-control unit 217 has invalidated touch operation of the start button 226, so the MFP 100 cannot be used. In this case, when a certain period of time (for example, one minute) has elapsed after determining that the intensity is the third level, the system-control unit 217 re-requests the MFP 100 to transmit the reservation information indicating the reservation status.

However, in the case where the reservation order does not move up to (1) (first) even if re-requested, the MFP 100 is re-requested to transmit the reservation information indicating the reservation status every time a certain period of time (for example, one minute) elapses until the reservation order moves up to (1) (first).

(Step S117)

The system-control unit 217 determines whether or not a reservation is at the top of the reservations.

In this case, when the reservation order indicated by the reservation information received from the MFP 100 is (2) (second), the system-control unit 217 determines that the reservation is not at the top of the reservations (step S117: NO).

On the other hand, when the reservation order indicated by the reservation information received from the MFP 100 is (1) (first), the system-control unit 217 determines that the reservation is at the top of the reservations (step S117: YES), and the process moves to step S118.

(Step S118)

The system-control unit 217 determines whether or not the start button 226 has been operated.

In this case, when there is no notification from the panel-operation-control unit 216 via the panel unit 202 indicating that the start button 226 has been touch-operated, the system-control unit 217 determines that the start button 226 has not been operated (step S118: NO).

On the other hand, when there is a notification from the panel-operation-control unit 216 via the panel unit 202 indicating that the start button 226 has been touch-operated, the system-control unit 217 determines that the start button 226 has been operated (step S118: YES), and the process moves to step S119.

(Step S119)

The system-control unit 217 requests the MFP 100 to start printing.

In this case, the system-control unit 217, via the communication-control unit 211, requests the MFP 100 to start printing.

At this time, on the MFP 100 side, printing is started based on the printing setting content received from the portable terminal 200.

As described above, in the present embodiment, the MFP 100 (electronic apparatus) transmits radio waves with a constant output, the portable terminal 200 receives radio waves, and together with sequentially transmitting a reservation request, the reservation content, and the start of the reservation content to the MFP 100 (electronic apparatus) in accordance with the change in the intensity of the radio waves according to the distance to the MFP 100 (electronic apparatus), sequentially informs of the current reservation status. As a result, even when the user does not go to the place where the MFP 100 (electronic apparatus) desired to be used is installed, by sequentially informing of the current reservation status, it is possible to inform of the number of persons wanting to use the MFP 100 (electronic apparatus) and the order in advance, and thus it is possible to improve user convenience.

Figure 5:
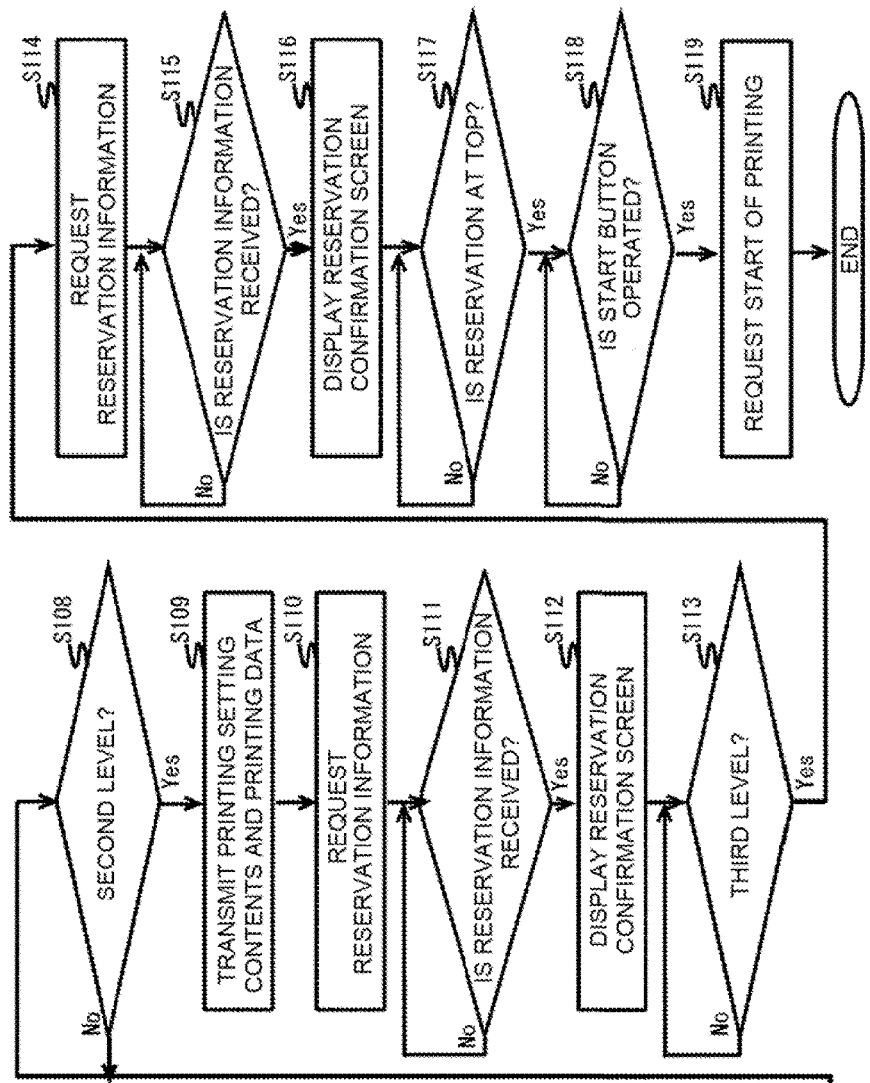
FIG. 5 is a flowchart for describing the reservation process in the information processing system in FIG. 1.

Incidentally, in step S108 illustrated in FIG. 5, the system-control unit 217 checks the intensity (dBm) of the beacon signals detected by the signal-intensity-detecting unit 214, and when it is determined that the intensity is the second level or the third level, the process may move to step S109. This takes into consideration that during the period from step S105 to step S107, the user passes through a range corresponding to the second level and enters within a range corresponding to the third level.

In addition, in the present embodiment, the case where the electronic apparatus is applied to an MFP 100 has been described, however the embodiment may be applied to another image forming apparatus such as a multifunction printer or the like. Moreover, the electronic apparatus is not limited to an image forming apparatus, and may be applied to an electronic apparatus such as an ATM (Automated Teller Machine) or the like for which it is expected that an unspecified number of users will wait in order to use the apparatus.

In the power supply control apparatus of the typical technique described above, correlation is given between the detection range of a moving object and the activation timing of an operated unit, whereby the operated unit can be activated in accordance with the detection range of the moving body.

In the case where the detection method by the power supply control apparatus of this kind of typical technique is applied to the above-described image forming apparatus, and a movable body can be detected in an arbitrary detection range, the temperature of the fixing unit can be increased to a specified value so that there will be no waiting for the temperature of the fixing unit to reach a specified value.

Incidentally, a remote operation application (hereinafter referred to as a remote operation app) that enables remote operation is prepared in the image forming apparatus. Therefore, by installing this remote operation app beforehand in a portable terminal such as a smartphone or the like, it is possible to perform remote operation of any one of the above-described printing function, copy function, FAX function, scanner function, and data transmitting/receiving function via a network that are provided in the image forming apparatus.

However, even in the case where the remote operation app is installed in a portable terminal, it is impossible to know beforehand how many users want to use the image forming apparatus. In that case, it is necessary to go to the place where the image forming apparatus desired to be used is installed and to wait until the image forming apparatus becomes available.

As a result, there is a desire for development of an apparatus capable of enhancing user's convenience by notifying a user of the number and order of people who want to use an image forming apparatus in advance even without going to the place where the image forming apparatus desired to be used is installed.

With the information processing system and the recording medium according to the present disclosure, by sequentially giving notification of the current reservation status, it is possible to inform a user of the number and order of people who want to use an electronic apparatus in advance even without the user going to the place where the image forming apparatus desired to be used is installed, and thus it is possible to improve user convenience.

What is claimed is:

1. An information processing system, comprising:
    an electronic apparatus that transmits radio waves at a constant output; and
    a portable terminal that receives the radio waves, and together with sequentially transmitting a reservation request, reservation content, and start of the reservation content to the electronic apparatus in accordance with a change in intensity of the radio waves according to a distance to the electronic apparatus, sequentially informs of current reservation status, wherein
    the radio waves include access information in wireless communication; and
    the portable terminal
    determines a change in intensity of the received radio waves in three stages of a first level to a third level (first level<second level<third level);
    in the case of the first level, requests the electronic apparatus for a reservation based on the access information, receives reservation information from the electronic apparatus indicating a current reservation status, and informs of current reservation status on a first reservation confirmation screen;
    in the case of the second level, transmits reservation contents and a request for the reservation information to the electronic apparatus, receives reservation information from the electronic apparatus indicating a current reservation status, and informs of current reservation status on a second reservation confirmation screen; and
    in the case of the third level, transmits a request for the reservation information to the electronic apparatus, and when the reservation order is at the top of the order, transmits a request to start the reservation contents.

2. A recording medium that is a non-transitory computer-readable recording medium for storing an apparatus control program executable on a computer for controlling an information processing system; and the computer, when executing the apparatus control program:
    by an electronic apparatus, transmits radio waves at a constant output; and
    by a portable terminal, receives the radio waves, and together with sequentially transmitting a reservation request, reservation content, and start of the reservation content to the electronic apparatus in accordance with a change in intensity of the radio waves according to a distance to the electronic apparatus, sequentially informs of current reservation status, wherein
    the radio waves include access information in wireless communication; and
    the computer, when executing the apparatus control program, by the portable terminal,
    determines a change in intensity of the received radio waves in three stages of a first level to a third level (first level<second level<third level);
    in the case of the first level, requests the electronic apparatus for a reservation based on the access information, receives reservation information from the electronic apparatus indicating a current reservation status, and informs of current reservation status on a first reservation confirmation screen,
    in the case of the second level, transmits reservation contents and a request for the reservation information to the electronic apparatus, receives reservation information from the electronic apparatus indicating a current reservation status, and informs of current reservation status on a second reservation confirmation screen, and
    in the case of the third level, transmits a request for the reservation information to the electronic apparatus, and when the reservation order is at the top of the order, transmits a request to start the reservation contents.

* * * * *